Oct. 18, 1932.  G. H. HAINES  1,882,820
CONVEYER APPARATUS
Filed Oct. 29, 1930
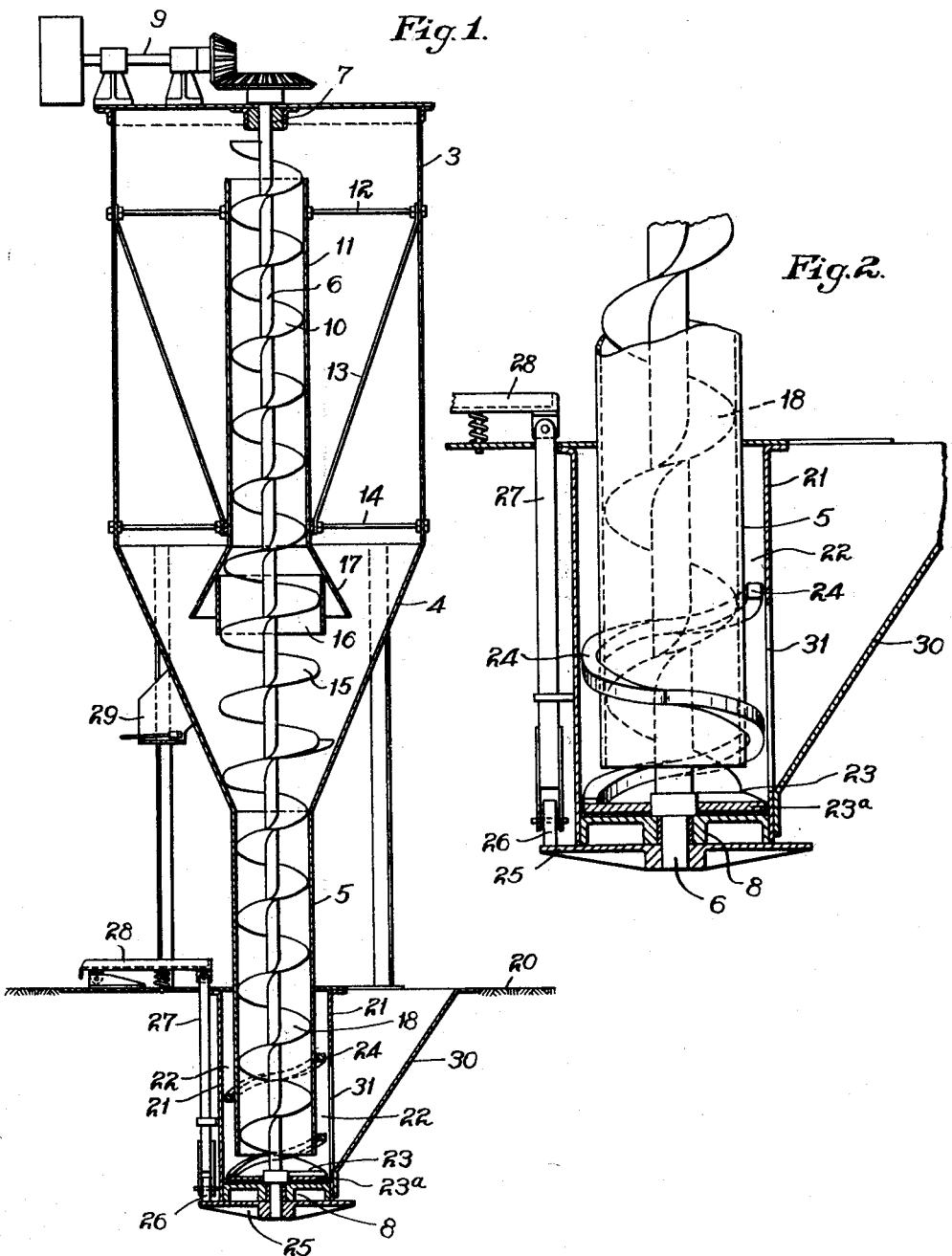
INVENTOR
George H. Haines
By
Archworth Martin
Attorney Patented Oct. 18, 1932

1,882,820

UNITED STATES PATENT OFFICE

GEORGE H. HAINES, OF CALEDONIA, OHIO, ASSIGNOR TO THE GRAIN MACHINERY COMPANY, OF MARION, OHIO, A CORPORATION OF OHIO

CONVEYER APPARATUS

Application filed October 29, 1930. Serial No. 491,952.

My invention relates to conveyer apparatus, and more particularly to screw conveyers for advancing and raising materials into a mixing chamber for charging the same, such as are commonly employed in feed mixers and the like, and constitutes an improvement upon the disclosure of my Patent No. 1,721,553, issued July 23, 1929.

Heretofore in the use of mixers and conveyers of the vertically-disposed screw type, it has been deemed necessary to employ force feed apparatus to direct the material laterally into the conveyer conduit, or, in the case of mixers, either to provide forced feed for introducing the material to the screw or to introduce the material through the top of the mixing chamber. In the case of force feed apparatus, additional power is required, while in both instances it has been necessary to lift the bags of material in order to pour the material into the top of the feed apparatus or into the top of the mixing chamber.

One object of my invention is to provide a conveyer structure with novel and improved means for directing materials into the path of the conveyer.

Another object of my invention is to provide a novel feeding structure for vertical conveyers.

Still another object of my invention is to provide a conveyer apparatus wherein the necessity for a separate force feed device and for lifting the materials to be conveyed are avoided.

A further object of my invention is to simplify and improve generally the structure and operation of conveyer structures.

Some of the forms my invention may take are shown in the accompanying drawing wherein Figure 1 is a vertical sectional view of the apparatus, and Fig. 2 is a view, on an enlarged scale, of a portion thereof.

In the drawing I have shown the conveyer apparatus as employed in connection with a feed mixing device which comprises a mixing chamber 3 having a hopper-like portion 4 which is connected with an extended cylindrical portion 5 that serves as a charging or conveyer conduit. A shaft 6 is vertically-disposed centrally of the mixing chamber and extends into the conveyer conduit 5. The shaft is journalled at its upper and lower ends in bearing blocks 7 and 8, and has a gear driving connection with a pulley shaft 9 which may be driven from any suitable source of power (not shown). A screw conveyer is carried by the shaft 6 and has an upper portion 10 disposed within a cylindrical conduit 11 that is held in place within the mixing chamber 3 by means of brace rods 12, 13 and 14. The screw conveyer has an intermediate enlarged portion 15 disposed within a short cylinder 16 that is mounted in a conically-shaped lower end or hood portion 17 of the cylinder 11, and functions as set forth in my said patent.

As shown more clearly in Fig. 2, the screw conveyer has a lower portion 18 disposed within the conduit 5, and this portion of the screw conveyer serves as a charging conveyer for the mixing device. The conduit 5 preferably extends below the floor level 20, to avoid the necessity for lifting the bags of material which are to be introduced therein.

A casing 21, disposed below the floor level, encloses the lower end of the conduit 5 and is spaced circumferentially thereof and extends slightly past the open end thereof, to form a charging chamber 22 for receiving the materials. A hopper 30 extends upwardly through the floor 20 and at its lower end communicates with the charging chamber 22 through an opening 31 in the wall of the casing 21, so that materials dumped into the hopper 30 will be fed by gravity into the charging chamber 22.

The lower portion 18 of the screw conveyer extends beyond the end of the conduit and terminates in an inclined or bevelled portion 23 which serves to force material up on the conveyer for movement into the conduit 5, where it is moved upwardly therethrough and delivered into the mixing chamber.

The lower end of the screw conveyer 18 is preferably attached to a plate 23a which is mounted on the shaft 6, at the bottom of the well formed by the casing 21 some distance below the end of the conduit 5, to receive and force upwards materials reaching it from the hopper 30. A second screw or spiral ribbon 24 is attached either directly to the shaft 6 or to the plate 23a so as to rotate in the charging chamber 22 when the shaft 6 is turned. The spiral of this ribbon screw 24 is twisted opposite to the screw conveyer 18 so that it tends to force materials reaching it from hopper 30 downwardly and inwardly around the lower end of the casing 5, overcoming the opposing centrifugal action of screw 18 and thereby greatly increasing the amount of material entering the casing 5 to be elevated therein by the main screw 18.

A second disc 25 is mounted on the lower end of the shaft 6 and extends beyond the edge of the casing 21. A roller 26, mounted on a vertically-movable rod 27 is adapted to ride on the face of the disc 25. The upper end of the rod 27 has pivotal engagement with one end of a platform 28, the other end of the platform being pivotally supported at the floor level. The roller 26 is preferably mounted eccentrically so that upon rotation thereof, reciprocating movement will be imparted to the vibrating platform through vertical movements of the rod 27. The hopper-like portion 4 of the mixing device is provided with a valve controlled spout 29, which serves as a discharge station or outlet for the conveyer, so that materials may be discharged therefrom into a container or sack which when placed upon the vibrating platform will be compacted or consolidated thereby. Instead of using an eccentrically-mounted roller for reciprocating the rod 27, I may employ a disc having a corrugated or undulatory upper face, or cams or lugs may be utilized on the face of the disc.

Although I have shown and described one form of my invention as used in connection with a mixing device, it is to be understood that it is not limited to such association and use, and that it is intended for use where generally vertically-disposed screw conveyers are employed, and is capable of various modifications and with other types of conveyers instead of the screw conveyer.

I claim as my invention:—

1. Conveyer apparatus comprising a rotatable screw conveyer, a feeder device operatively connected to the screw conveyer for rotation on the same axis, spaced circumferentially of the said conveyer and extending longitudinally of a portion thereof, and a stationary tubular conduit for said screw conveyer positioned between the said conveyer and the said feeder device.

2. Conveyer apparatus comprising an upwardly disposed stationary conduit having an open lower end portion, a screw conveyer device for moving materials upwardly through the conduit, a spiral feeder device positioned circumferentially of the lower end portion of said conduit, and a casing enclosing said feeder device.

3. Conveyer apparatus comprising a stationary upwardly-extending conduit, a rotatable screw device in said conduit, and a rotatable feeder device of spiral form positioned circumferentially of said screw device and said conduit, and adjacent to the one end thereof, the twists or helices of the said screw device and said feeder device being formed in opposite directions thereby to move the materials to be conveyed in opposite directions.

4. Conveyer structure comprising a casing, a stationary conduit extending into said casing and terminating adjacent to the lower end thereof, the conduit being spaced radially of said casing to form a charging chamber, a screw conveyer rotatably mounted in said conduit, and a rotatable spiral feeder device mounted in said charging chamber and having operative connection with said screw conveyer.

5. Conveyer structure comprising a casing, a stationary conduit extending into said casing and terminating adjacent to the lower end thereof, the conduit being spaced radially of said casing to form a charging chamber, a screw conveyer rotatably mounted in said conduit, a rotatable spiral feeder device mounted in said charging chamber and having operative connection with said screw conveyer, and a hopper having communication with said chamber for directing materials thereto.

6. Conveyer apparatus comprising a stationary conduit, a screw conveyer operating in said conduit, a feeder device of spiral-like form encircling said conduit adjacent to and extending beyond the entrance end thereof, and a stationary casing surrounding the feeder device.

7. Conveyer apparatus comprising an upwardly-extending stationary conduit, a screw conveyer operating in said conduit, and a feeder device of spiral-like form encircling said conduit adjacent to the entrance end thereof, the screw conveyer and the feeder device being formed to force material in opposite directions.

8. Conveyer apparatus comprising an upwardly extending stationary conduit open at its lower end, a screw conveyer within the conduit, a screw feed device disposed exteriorly of the conduit, and having its helices formed oppositely to the helices of the screw conveyer, and means for rotating the said screw members for advancing material downwardly to the lower end of the conduit and upwardly within the conduit.

9. Conveying and mixing apparatus comprising a mixing chamber, a stationary conduit communicating with the lower portion of said chamber, a vertical conduit located in the chamber and open at both of its ends, means disposed alongside of and exteriorly of the first-named conduit and operating to move material in a direction generally parallel to the conduit and toward the end thereof which is remote from the chamber, means advancing the material in the opposite direction to said chamber, and means for circulating the material through the second-named conduit.

10. Conveying and mixing apparatus comprising a mixing chamber, a stationary vertical conduit communicating with the lower portion of the said chamber, a vertical conduit located in the chamber and open at both of its ends, means disposed alongside of and exteriorly of the first-named conduit and operating to move material in a direction generally parallel to the conduit and toward the lower end thereof, a driven shaft extending through said conduits, and screw conveyer means carried by said shaft for moving material upwardly through the said conduits.

11. Conveying and mixing apparatus comprising a mixing chamber, a stationary vertical conduit communicating with the lower portion of said chamber, a vertical conduit located in the chamber and open at both of its ends, a spiral device disposed circumferentially of the first-named conduit and operating to move material toward its lower end, a driven shaft extending through said conduits, and screw conveyer means carried by said shaft for moving material upwardly through the said conduits.

12. Conveying and mixing apparatus comprising a mixing chamber, a stationary vertical conduit communicating with the lower portion of the said chamber, a vertical conduit located in the chamber and open at both of its ends, a spiral device disposed circumferentially of the first-named conduit and operating to move material toward its lower end, a driven shaft extending through said conduits, and screw conveyer means carried by said shaft for moving material upwardly through the said conduits, the said shaft having operative connection also with the spiral device.

13. Conveyer apparatus comprising a vertically-extending screw conveyer, a spiral feeder device disposed coaxially of the conveyer and in radially spaced relation thereto, a casing surrounding the feeder device, the said conveyer and feeder being connected at their lower ends and extending to the bottom wall of the casing, and a conduit disposed between the conveyer and the feeder with its lower end terminating above the point of connection between the said conveyer and feeder.

In testimony whereof I, the said GEORGE H. HAINES have hereunto set my hand.

GEORGE H. HAINES.